United States Patent
Kim et al.

(10) Patent No.: US 8,233,902 B2
(45) Date of Patent: Jul. 31, 2012

(54) APPARATUS AND METHOD FOR HANDOVER IN A WIRELESS COMMUNICATION SYSTEM

(75) Inventors: Yu-Sin Kim, Osan-si (KR); Gwan-Gyu Seo, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 423 days.

(21) Appl. No.: 12/464,288

(22) Filed: May 12, 2009

(65) Prior Publication Data

US 2009/0318150 A1    Dec. 24, 2009

(30) Foreign Application Priority Data

Jun. 18, 2008    (KR) .................. 10-2008-0057166

(51) Int. Cl.
*H04Q 7/20*    (2006.01)

(52) U.S. Cl. ........ 455/436; 455/437; 455/438; 455/561; 455/456.2; 370/331

(58) Field of Classification Search .......... 455/436–444, 455/561, 456.2; 370/331
See application file for complete search history.

(56) References Cited

U.S. PATENT DOCUMENTS

| | | | |
|---|---|---|---|
| 5,784,695 A * | 7/1998 | Upton et al. ................... | 455/442 |
| 6,385,457 B1 * | 5/2002 | Dam et al. ................. | 455/456.2 |
| 6,473,614 B1 * | 10/2002 | Quensel et al. ............... | 455/436 |
| 7,477,920 B2 * | 1/2009 | Scheinert et al. ............. | 455/561 |
| 7,933,599 B2 * | 4/2011 | Fernandez-Corbaton et al. ............................ | 455/436 |
| 2003/0083090 A1 | 5/2003 | Huh et al. | |
| 2004/0141572 A1 * | 7/2004 | Johnson et al. ............... | 375/350 |
| 2006/0194583 A1 | 8/2006 | Tamura et al. | |
| 2006/0229073 A1 | 10/2006 | Das et al. | |
| 2010/0074227 A1 * | 3/2010 | Boncz et al. .................. | 370/331 |

FOREIGN PATENT DOCUMENTS

| | | |
|---|---|---|
| EP | 1 672 939 A1 | 6/2006 |
| KR | 10-2006-0128542 A | 12/2006 |
| KR | 10-2008-0033396 A | 4/2008 |
| KR | 10-2008-0041513 A | 5/2008 |
| WO | 99/52226 A1 | 10/1999 |
| WO | 00/76085 A1 | 12/2000 |

* cited by examiner

*Primary Examiner* — Charles Shedrick
(74) *Attorney, Agent, or Firm* — Jefferson IP Law, LLP

(57) ABSTRACT

An apparatus and method for handover in a wireless communication system are provided. The method includes, upon handover execution, estimating a channel, controlling a transmission power of a Mobile Station (MS) depending on the channel estimation result, and transmitting a handover message using the controlled transmission power.

16 Claims, 3 Drawing Sheets

APPARATUS AND METHOD FOR HANDOVER IN A WIRELESS COMMUNICATION SYSTEM

PRIORITY

This application claims the benefit under 35 U.S.C. §119 (a) of a Korean patent application filed in the Korean Intellectual Property Office on Jun. 18, 2008 and assigned Serial No. 10-2008-0057166, the entire disclosure of which is hereby incorporated by reference.

BACKGROUND OF THE INVENTION

1. Field of the Invention

The present invention relates to an apparatus and method for handover of a Mobile Station (MS) in a wireless communication system. More particularly, the present invention relates to an apparatus and method for controlling the transmission power of an MS depending on a channel environment and improving a handover success rate.

2. Description of the Related Art

Generally, portable terminals supporting $2^{nd}$ Generation (2G) communication systems and $3^{rd}$ Generation (3G) communication systems perform handover within the same communication system or from one communication system to another. For example, portable terminals supporting Global System for Mobile communication (GSM) systems and Wideband Code Division Multiple Access (WCDMA) systems may perform handover between the GSM systems and may perform handover from a WCDMA system to a GSM system.

FIG. 1 illustrates a signal flow during a handover from a GSM or WCDMA system to a GSM system according to the conventional art.

Referring to FIG. 1, a Mobile Station (MS) 100 periodically reports information of a serving cell and an adjacent cell to a network 110 through step 121 during connection of a voice call. At this time, if a signal level of the serving cell is poor in a state where the MS 100 is accessing a GSM system, as in step 123, the MS 100 reports information in a format that is the same as in a legacy system to the network 110. If a signal level of the serving cell is poor in a state where the MS 100 is accessing a WCDMA system, as in step 125, the MS 100 reports signal information (i.e., an Event 3A) indicating that the serving cell has a value equal to or less than a threshold value, or signal information (i.e., an Event 3C) indicating that the adjacent cell has a value equal to or more than a threshold value, to the network 110. By doing so, in step 127, the MS 100 receives a handover command message from the network 110.

The MS 100 receiving the handover command message transmits a handover access message to the network 110 through steps 129 and 131. Then, the MS 100 starts a preset control timer (i.e., a T3124 timer) and, as in step 133, waits to receive a physical information message before the control timer expires. At this time, if the handover is an intra handover carried out between cells within a Base Station (BS), there is no need to perform a synchronization process. Therefore, the MS 100 directly proceeds to step 135 below without receiving the physical information message.

In step 135, the MS 100 transmits a Set Asynchronous Balanced Mode (SABM) message attempting channel connection to the network 110 and then, waits to receive an Unnumbered Acknowledge (UA), which is a reply to the SABM, from the network 110 before a preset control timer (i.e., a T200 timer) expires. If the UA is not received, the MS 100 retransmits the SABM attempting channel connection through step 137. At this time, the MS 100 transmits the SABM a preset number of times until the UA is received. If, after transmitting the SABM the preset number of times, the UA is not received, the MS 100 returns to a previous serving cell.

If receiving a UA that is a reply message from the network 110 through step 139, the MS 100 transmits a handover complete message to the network 110 and completes a handover procedure through step 141.

As described above, handover is performed if a signal level received by an MS from a serving cell is worse than that of an adjacent cell, and fails if a reply to a handover message transmitted by the MS is not received by the MS within a threshold time period. Also, the MS performs the handover using a predefined output power, i.e., the transmission power corresponding to a power control level received through a Slow Associated Control Channel (SACCH) from a network.

In the case of using a technique for performing handover depending on a Receive Signal Strength Indicator (RSSI) of the MS and reception or non-reception of a reply message as above, there is a problem in that, even if the RSSI of the MS is high, the handover may fail because of the transmission signal quality of the MS. For example, if the transmission signal quality of the MS is poor, handover may fail because the MS fails to transmit the handover access messages of steps 129 and 131 or the SABMs of steps 135 and 137, and thus fails to receive any replies.

Thus, there is a need to provide a handover technique considering the transmission signal quality of the MS.

SUMMARY OF THE INVENTION

An aspect of the present invention is to address at least the above-mentioned problems and/or disadvantages and to provide at least the advantages described below. Accordingly, an aspect of the present invention is to provide an apparatus and method for handover of a Mobile Station (MS) in a wireless communication system.

Another aspect of the present invention is to provide an apparatus and method for controlling the transmission power of an MS and for improving a handover success rate in a wireless communication system.

A further aspect of the present invention is to provide an apparatus and method for, upon handover, controlling transmission power of an MS depending on channel circumstances in a wireless communication system.

Yet another aspect of the present invention is to provide an apparatus and method for, upon handover, controlling the transmission power of an MS depending on reception or non-reception of a handover reply message in a wireless communication system.

The above aspects are achieved by providing an apparatus and method for handover in a wireless communication system.

In accordance with an aspect of the present invention, a method for performing handover by a Mobile Station (MS) in a wireless communication system is provided. The method includes, upon handover execution, estimating a channel, controlling a transmission power of the MS depending on the channel estimation result, and transmitting a handover message using the controlled transmission power.

In accordance with another aspect of the present invention, an apparatus for performing handover in a wireless communication system is provided. The apparatus includes a controller and a transmitter/receiver. Upon handover execution, the controller estimates a channel and controls a transmission power of an MS depending on the channel estimation result. The transmitter/receiver transmits a handover message using the controlled transmission power depending on the control of the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A technology for controlling transmission power of a Mobile Station (MS) considering a channel environment in a wireless communication system according to an exemplary embodiment of the present invention is described below. An exemplary embodiment of the present invention is applicable to handover between $2^{nd}$ Generation (2G) communication systems and handover between a $3^{rd}$ Generation (3G) communication system and a 2G communication system. In the following description, handover between Global System for Mobile communication (GSM) systems is described, for example.

Figure 1:
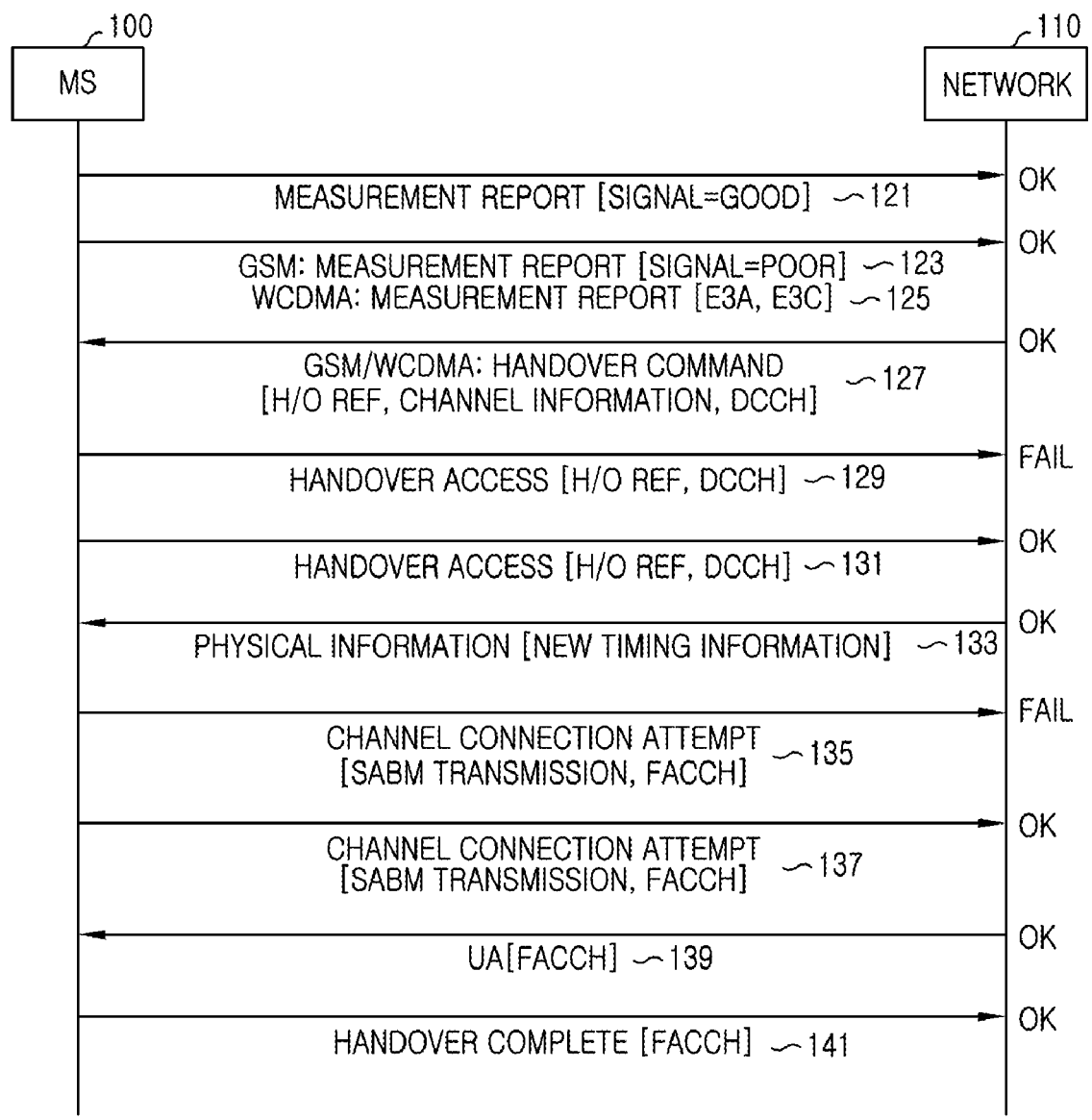
FIG. 1 is a ladder diagram illustrating a signal flow for handover from a Global System for Mobile communication (GSM) or Wideband Code Division Multiple Access (WCDMA) system to a GSM system according to the conventional art.
Figure 2:
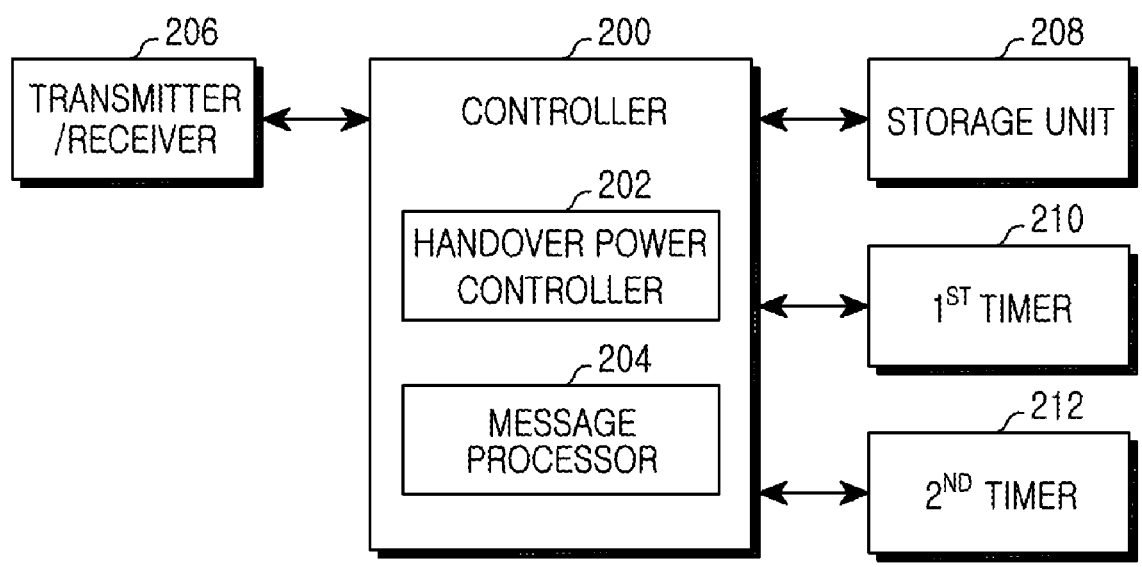
FIG. 2 is a block diagram illustrating a construction of a Mobile Station (MS) in a wireless communication system according to an exemplary embodiment of the present invention.

FIG. 2 is a block diagram illustrating a construction of an MS in a wireless communication system according to an exemplary embodiment of the present invention.

Referring to FIG. 2, the MS includes a controller (i.e., a Micro-Processor Unit (MPU)) 200, a transmitter/receiver 206, a storage unit 208, a first timer 210, and a second timer 212. The controller 200 includes a handover power controller 202 and a message processor 204.

The controller 200 performs a general operation of the MS, e.g., a process and control for voice telephony, data communication, and handover. Particularly, according to an exemplary embodiment of the present invention, the controller 200 includes the handover power controller 202 and the message processor 204. Thus, upon handover execution, the controller 200 executes a process of controlling transmission power of the MS depending on a channel environment. That is, the controller 200 increases or maintains the transmission power of the MS through the handover power controller 202, and generates and analyzes a message for handover through the message processor 204. Also, the controller 200 determines the need for retransmission of a message and a handover failure or success using the first and second timers 210 and 212 and processes and controls an operation depending on the results.

When a handover command message is received, the handover power controller 202 increases or maintains the transmission power of the MS. In an exemplary implementation, the handover power controller 202 determines the transmission power by measuring Bit Error Rates (BERs) for a continuous number of channels, determining an average BER based on the measured BERs, comparing the average BER with a threshold value, and setting a power control level based on the comparison. Also, if physical information is not received before the expiration of the first timer 210 and if an Unnumbered Acknowledge (UA) message is not received before the expiration of the second timer 212 so that a return to a previous cell is determined, the handover power controller 202 increases the transmission power by increasing the power control level. At this time, an increase width of the power control level may be set and changed by a user or a service provider. For example, the power control level may increase by only one level or may increase by three levels at one time.

The handover power controller 202 manages initialization and change setting of variables for increasing or maintaining a power control level for determining a transmission power of the MS. For example, the handover power controller 202 manages variables for a power control level increase as in Table 1 below.

TABLE 1

| Variable | Value | Description |
| --- | --- | --- |
| Power_Level_Controller | 00 | No power control level change |
|  | 01 | Power control level increase |
|  | 10 | Power control level decrease |
| Bad_BER_Ind | 00 | Average BER ≧ Threshold value |
|  | 01 | Average BER < Threshold value |

TABLE 1-continued

| Variable | Value | Description |
|---|---|---|
| SABM_Retrans_Failure_Counter | 000 | No failure |
| | 001 | 1$^{st}$ failure |
| | 010 | 2$^{nd}$ failure |
| | 011 | 3$^{rd}$ failure |
| | 100 | 4$^{th}$ failure |
| | 101 | 5$^{th}$ failure |
| | 110 | 6$^{th}$ failure |
| | 111 | 7$^{th}$ failure |

Here, the 'Power_Level_Controller' denotes a variable used for determining a current power control level. If the 'Power_Level_Controller' value is equal to '00', the current power control level is maintained. If it is equal to '01', the current power control level is increased and if it is equal to '10', the current power control level is decreased. A GSM system is described as an example. If a power control level is initially set to '3' and the transmission power is equal to 37 dBm, when the 'Power_Level_Controller' value is set to '01', the power control level increases by one level and becomes '4', so the transmission power changes from the 37 dBm to 35 dBm. Here, the handover power controller 202 sets the 'Power_Level_Controller' value to '01' or '10', increases or decreases the transmission power, and initializes the 'Power_Level_Controller' value by '00'.

The 'Bad_BER_Ind' denotes a variable used for determining a current Radio Frequency (RF) interference environment for a transmit Dedicated Control Channel (DCCH) or Slow Associated Control Channel (SACCH) of a serving cell. The 'Bad_BER_Ind' is set to '00' or '01' depending on an average BER value, thus having influence on an increase of a power control level. That is, if the 'Bad_BER_Ind' is set to '01', the handover power controller 202 sets the 'Power_Level_Controller' value to '01', increasing the power control level by one level.

The 'SABM_Retrans_Failure_Counter', which is a counter representing a transmission failure of SABM, increases whenever a reply to Set Asynchronous Balanced Mode (SABM) transmission is not received before the expiration of the second timer 212 and, if a handover process is terminated, is initialized to '0'.

The message processor 204 generates a message necessary for handover (e.g., a measurement report message, a handover access message, a Set Asynchronous Balanced Mode (SABM) message, and a handover complete message), provides the generated message to the transmitter/receiver 206, receives a handover message (e.g., a handover command message, a physical information message, and a UA message) from the transmitter/receiver 206, and analyzes the handover message.

The transmitter/receiver 206 performs a role of transmitting/receiving a message with a network depending on the control of the controller 200. Particularly, the transmitter/receiver 206 transmits handover messages to the network using a transmission power controlled by the handover power controller 202.

The storage unit 208 stores a program necessary for a general operation of the MS and a variety of kinds of information, stores a table representing the transmission power depending on the power control level according to an exemplary embodiment of the present invention, and stores a threshold value for comparison with the BER and threshold number of times for limiting the number of SABM transmissions.

The first timer 210 and second timer 212 measure time depending on the control of the controller 200.

Figure 3:
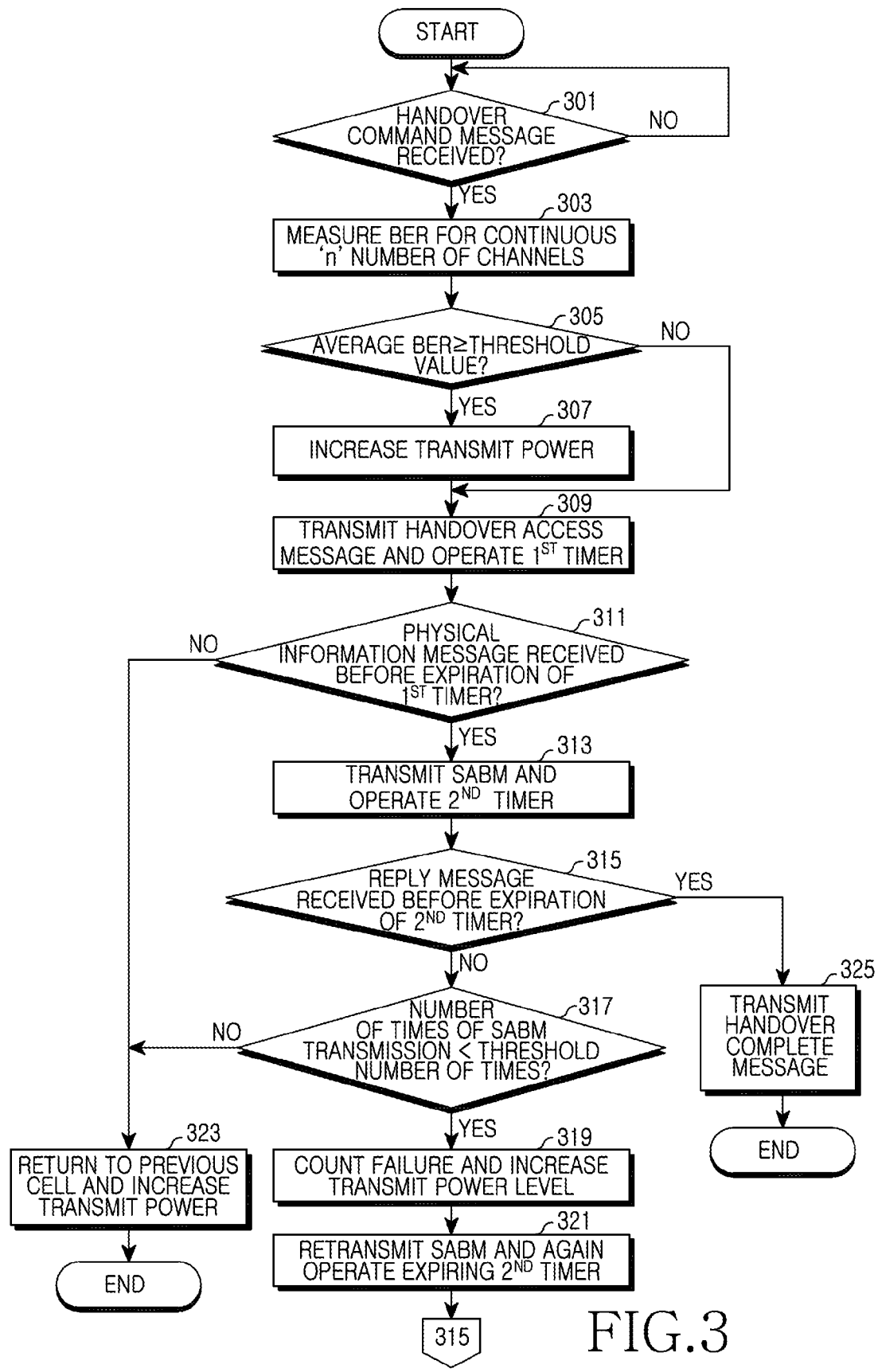
FIG. 3 is a flow diagram illustrating a procedure for handover of an MS in a wireless communication system according to an exemplary embodiment of the present invention.

FIG. 3 is a flow diagram illustrating a procedure for handover of an MS in a wireless communication system according to an exemplary embodiment of the present invention.

Referring to FIG. 3, in a state where a voice call is in progress in step 301, if it is determined that a handover command message is received from a network, the MS proceeds to step 303 and determines a BER for a continuous number of channels. At this time, the MS may use a transmit DCCH (i.e., SACCH) or Traffic Channel (TCH) of a serving cell for the BER measurement. Also, whether to use any channel or use any number of transmission frames may be arbitrarily changed and set by a user. For example, in a GSM system, the MS may measure a BER for 'n' number of SACCH frames repeated every 13th frame among 26 frames or may measure the BER for a continuous 'k' number of TCH frames among the 26 frames. Similarly, in a WCDMA system, the MS may measure a BER for a continuous 'n' number of TCH frames. That is, the MS may measure a BER for a number of frames repeated at a period of 'n' among a continuous 'k' number of frames.

In step 305, the MS determines if an average of the measured BER is greater than or equal to a threshold value. If the average of the BER is greater than or equal to the threshold value, in step 307, the MS increases a power control level, increases transmission power and, in step 309, transmits a handover access (Handover Access) message to a network using the increased transmission power and operates a first timer 210. On the other hand, if the average of the BER is determined to be less than the threshold value in step 305, the MS proceeds to step 309 without increasing the transmission power, thus transmitting a handover access message using the maintained transmission power and operating the first timer 210. Here, the MS increases the transmission power or maintains as it is as above, by setting a variable (Bad_BER_Ind) representing an RF interference environment to '00' or '01' depending on the average BER and increasing or maintaining a power control level.

In step 311, the MS determines if a physical information message is received before the expiration of the first timer 210. Here, if the handover is an intra handover, which is a handover carried out between cells within a BS, there is no need to perform a synchronization process and thus the MS omits step 311 and proceeds to subsequent step 313.

If a physical information message is not received before the expiration of the first timer 210, in step 323, the MS terminates a handover procedure, returns to a previous cell, increases the power control level, increases a current transmission power, and terminates the process according to an exemplary embodiment of the present invention. Here, the MS may increase the transmission power, by setting a variable (i.e., a Power_Level_Controller) determining a current power control level to '01' and increasing a current power level.

If a physical information message is received before the expiration of the first timer 210, in step 313, the MS transmits an SABM message attempting channel connection and operates a second timer 212. The MS proceeds to step 315 and determines if a UA message, which is a reply message to the SABM, is received before the expiration of the second timer 212. If the UA message is received, the MS proceeds to step 325, thus transmitting a handover complete message and terminating the process according to an exemplary embodiment of the present invention. As above, if a physical information message is received or a UA message is received, the MS sets a variable (i.e., a Power_Level_Controller) determining a current power control level to '00' and maintains the transmission power without changing a current power level.

If the UA message is not received until the second timer 212 expires, the MS proceeds to step 317 and determines if the number of times the MS has transmitted an SABM is less than a threshold number of times. If the number of times of transmitting the SABM is less than the threshold number of times, the MS proceeds to step 319, increases a counter (i.e., an SABM_Retrans_Failure_Counter) representing a failure of the SABM transmission, increases a power control level, and increases the transmission power. In step 321, the MS retransmits the SABM message using the increased transmission power, initializes and again operates the second timer 212, returns to step 315, and again performs the subsequent steps. Here, the MS may increase the transmission power by setting a variable (i.e., a Power_Level_Controller) determining a current power control level to '01' and increasing a current power level.

If the number of times of transmitting the SABM is greater than or is equal to the threshold number of times in step 317, that is, if the SABM is transmitted the threshold number of times, the MS proceeds to step 323, terminates the handover procedure, returns to a previous cell, increases the power control level, increases the current transmission power, and terminates the process according to an exemplary embodiment of the present invention.

An exemplary embodiment of the present invention has an effect of, upon handover, controlling the transmission power of an MS considering a channel environment and reception or non-reception of a handover reply message, thereby being capable of improving a handover success rate in a wireless communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing handover by a Mobile Station (MS) in a wireless communication system, the method comprising:
   upon handover execution, estimating a channel;
   controlling a transmission power of the MS depending on the channel estimation result;
   transmitting a handover message using the controlled transmission power;
   transmitting a handover access message using the controlled transmission power;
   determining if a physical information message is received within a time period; and
   when the physical information message is not received, terminating handover, moving to a previously accessed cell, and increasing the transmission power.

2. The method of claim 1, wherein the controlling of the transmission power of the MS comprises:
   measuring a Bit Error Rate (BER) for the channel;
   comparing an average of the measured BER with a threshold value; and
   determining to one of increase and maintain the transmission power for a next transmit frame depending on the comparison result.

3. The method of claim 1, wherein the controlling of the transmission power of the MS comprises at one of increasing and decreasing a power control level by a preset level.

4. The method of claim 1, wherein the handover comprises at least one of a handover between two systems having the same standard, and handover between two systems having different standards.

5. A method for performing handover by a Mobile Station (MS) in a wireless communication system, the method comprising:
   upon handover execution, estimating a channel;
   controlling a transmission power of the MS depending on the channel estimation result;
   transmitting a handover message using the controlled transmission power;
   transmitting a Set Asynchronous Balanced Mode (SABM) message using the controlled transmission power;
   when an Unnumbered Acknowledge (UA) message is not received within a time period, comparing the number of times of transmitting the SABM message with a threshold; and
   when the number of times of SABM transmission is less than the threshold, increasing the transmission power for a next transmission frame; and retransmitting the SABM message using the increased transmission power.

6. The method of claim 5, further comprising: when the number of times of SABM transmission is greater than or equal to the threshold, moving to a previously accessed cell and increasing a transmission power.

7. The method of claim 5, further comprising: when the UA message is received within the time period, transmitting a message indicating that handover is complete.

8. The method of claim 5, further comprising: when the number of times of SABM transmission is less than the threshold, increasing a counter indicating the number of times of transmitting the SABM message.

9. An apparatus for performing handover in a wireless communication system, the apparatus comprising:
   a controller for, upon handover execution, estimating a channel and controlling a transmission power of a Mobile Station (MS) depending on the channel estimation result; and
   a transmitter/receiver for transmitting a handover message using the controlled transmission power depending on the control of the controller,
   wherein the controller controls the transmitter/receiver and transmits a handover access message using the controlled transmission power and, when a physical information message is not received within a time period, terminates handover, moves to a previously accessed cell, and increases a transmit power.

10. The apparatus of claim 9, further wherein the controller measures a Bit Error Rate (BER) for the channel, compares an average of the measured BER with a threshold value, and determines to one of increase and maintain the transmission power for a next transmit frame.

11. The apparatus of claim 9, wherein the controller one of increases and decreases a power control level by a preset level and controls the transmission power of the MS.

12. The apparatus of claim 9, wherein the handover comprises one of handover between two systems having the same standard, and handover between two systems having different standards.

13. An apparatus for performing handover in a wireless communication system, the apparatus comprising:
   a controller for, upon handover execution, estimating a channel and controlling a transmission power of a Mobile Station (MS) depending on the channel estimation result; and a transmitter/receiver for transmitting a handover message using the controlled transmission power depending on the control of the controller, wherein the controller controls the transmitter/receiver and transmits a Set Asynchronous Balanced Mode (SABM) message using the controlled transmit power and, when an Unnumbered Acknowledge (UA) message is not received within a time period, compares the number of times of transmitting the SABM message with a threshold number of times and, when the number of times of SABM transmission is less than the threshold number of times, increases the controlled transmit power and retransmits the SABM message.

14. The apparatus of claim 13, wherein, when the number of times of SABM transmission is equal to the threshold number of times, the controller moves to a previously accessed cell and increases the controlled transmission power.

15. The apparatus of claim 13, further comprising: when the UA message is received within the time period, transmitting a message indicating that handover is complete.

16. The apparatus of claim 13, further comprising: when the number of times of SABM transmission is less than the threshold, increasing a counter indicating the number of times of transmitting the SABM message.

* * * * *